March 4, 1958
R. L. WRINKLE
2,825,243
POWER TRANSMISSION APPARATUS
Filed May 18, 1953
3 Sheets-Sheet 1
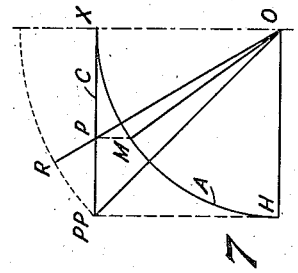
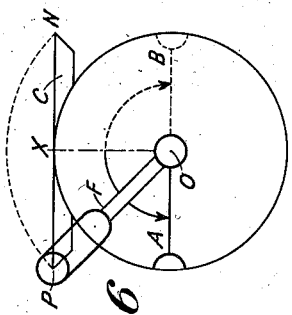
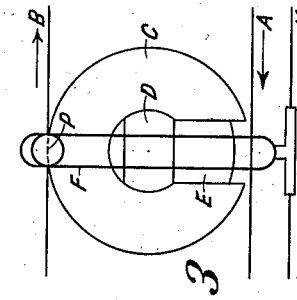
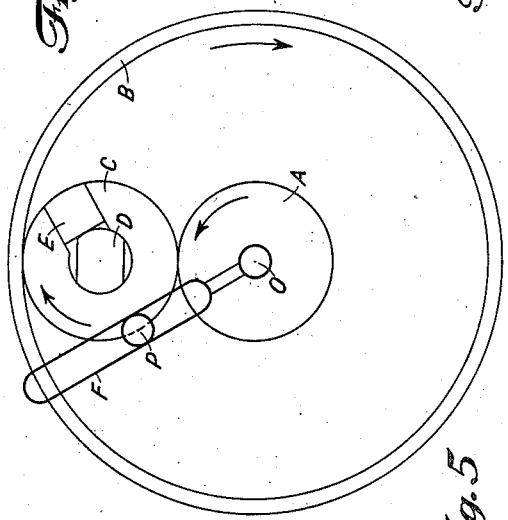
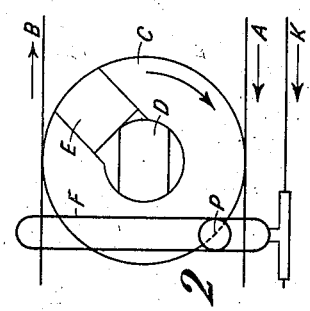
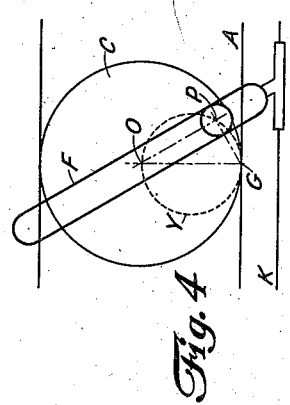
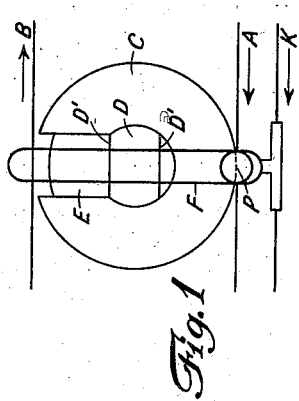
INVENTOR.
Raymond L. Wrinkle
BY
Gardner & Zimmerman
attys.

March 4, 1958

R. L. WRINKLE 2,825,243

POWER TRANSMISSION APPARATUS

Filed May 18, 1953

INVENTOR.
Raymond L. Wrinkle
BY
Gardner & Zimmerman
Attys.

March 4, 1958     R. L. WRINKLE     2,825,243
POWER TRANSMISSION APPARATUS
Filed May 18, 1953     3 Sheets-Sheet 3

INVENTOR.
Raymond L. Wrinkle
BY

United States Patent Office 2,825,243
Patented Mar. 4, 1958

2,825,243

POWER TRANSMISSION APPARATUS

Raymond L. Wrinkle, Oakland, Calif.

Application May 18, 1953, Serial No. 355,574

15 Claims. (Cl. 74—674)

This invention relates to apparatus for transmitting power, particularly in the nature of rotary movement, from one train of mechanism to another, and is more particularly directed towards a power transmission capable of performing a wide variety of functions as may be necessitated by particular job requirements.

As is well known in the art, there are countless numbers of different types of power transmissions available, yet such devices possess some or all of the following disadvantages or shortcomings. For example, in numerous prior devices, there is an abrupt and sudden acceleration of the driven member when operatively connected to the power source, thereby preventing smooth starting and stopping of the apparatus. In prior devices using a pair of friction clutches, there is an appreciable power loss during transfer when one of the clutches releases one train of mechanism and the other clutch picks up or engages another train, and also, as the two clutches work against each other, there is resulting heat, wear, requirement of periodic adjustment, and some form of complex control means for varying the load. In order to avoid some of the foregoing undesirable features, numerous power transmissions are of the hydraulic type, but it is elementary that with an hydraulic system, there are very large power losses, excessive heating and/or loss of fluid, high cost of manufacture and maintenance, and generally require a complex and heavy installation.

In accordance with the teachings of the present invention, and as a principal object or feature thereof, I have provided a power transmission capable of being selectively used as an accelerating device for starting and stopping a driven member, as a reversing mechanism for reversing the direction of motion of a driven member, as a device for transferring a driving force from one driven member to another, as a device for selectively transferring a driving force from two different driving members which may be rotating in the same or opposite directions and at the same or different speeds, or as a device adaptable to numerous types of power systems wherein a change of velocity ratio and/or a change of direction is required.

Another object of my invention is to provide a power transmission as characterized above in which a driven member may be brought to speed and rotated in a desired direction with gradual and predetermined acceleration, and with the driven member in simultaneous operating relationship with different driving forces.

A further object of this invention is to provide apparatus of the type described in which the rate of acceleration and deceleration of the driven member is a predetermined factor in the design of the unit, and in which such rate will remain constant over long periods of continuous use.

A still further object of the invention is to provide a power transmission as hereinabove described in which there is no disengagement of the driven member from the power source as in mechanisms where friction clutches are used under power or idle transfer conditions.

Yet another object of this invention is to provide a power transmission which is relatively simple and inexpensive to manufacture and maintain, and which is extremely efficient for all sizes and under all working conditions, the only power loss being that inherent in any gear train.

Another object of my invention is to provide apparatus of the type described in which a pair of driving gears are operatively connected to an idle gear which drives a driven member and in which each of the driving gears may be disengaged from its respective power source so as to transmit no motion to the driven member.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figures 1 through 7 are diagrammatic representations which illustrate the principle of operation of the apparatus of my invention.

Figure 8:
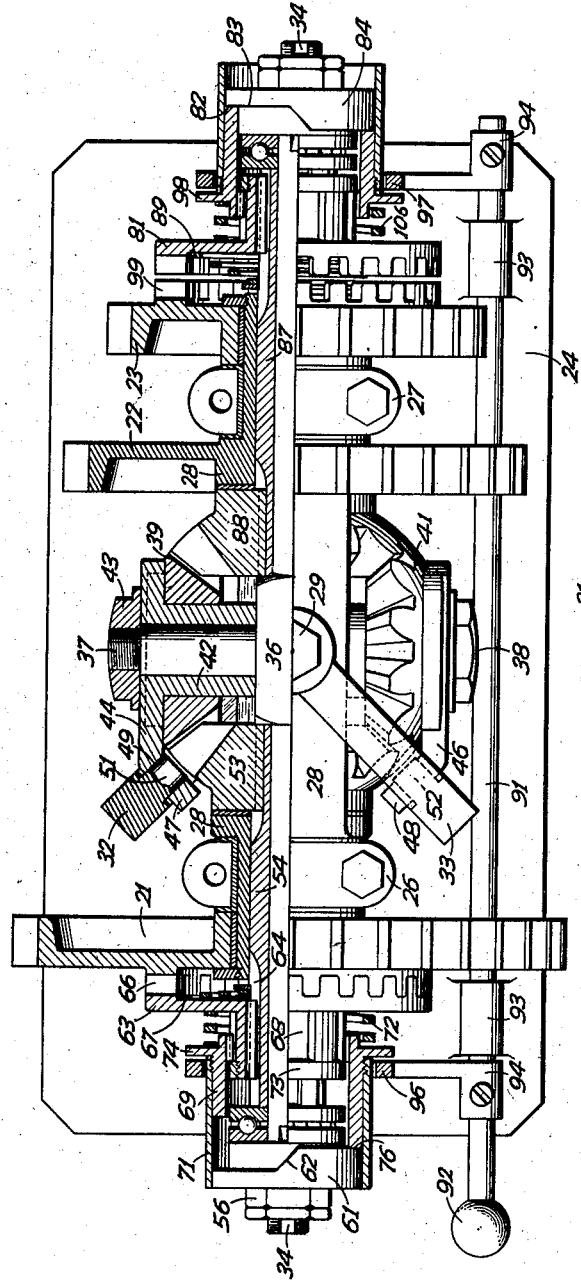
Figure 8 is a plan view, partly in section, of one form of power transmission.

Before discussing in any detail the exemplary devices which embody the features of my invention, it is believed desirable, for a better understanding of the principles of the invention, to first refer to the diagrammatic representations of the drawings.

In Figures 1, 2, 3, 5 and 6, two drive elements are represented by A and B moving at the same speed but in opposite directions. Interposed between A and B is a differential member, represented by a cylinder or wheel C, adapted to be engaged with either of the drive elements A and B, or to be engaged with both at once. C rotates on an idle axis which plays no part in the transmission of driving forces but merely positions C for operative engagement with A and B. The driving forces are transmitted through an eccentric axis of C, located on the perimeter of C, so that the eccentric axis may coincide with either the line of contact of C with A or the line of contact of C with B. While the eccentric axis lies on A it must move with A, and while it lies on B it must move with B. A pin, P, secured to C and lying on its eccentric axis, moves in a slide in a driven element F, the slide extending at right angles to the line of motion of the drive and driven elements, permitting the pin P to move from A to B, but transmitting to the driven element all components of the motion of P in the line of motion of the driven element. When the central axis of C is stationary this motion of pin and slide is readily understood, being common to many mechanisms, and for this reason the drive elements are shown as having equal and opposite speed. However, it must be noted that the operation of the mechanism depends on the difference in velocity between the two drive elements without regard to speed or direction, and motion of the central axis of C during the transfer operation is determined only by the relative velocity of the drive elements.

In Figures 1 through 3, the lines or drive elements A and B represent any two surfaces tangent to a cylinder C at diametrically opposed points and moving at the same speed, but in opposite directions, as indicated by the arrows. It will be noted that in Figure 1 line A is in contact with the periphery of cylinder C and is representative of the entire cylinder assembly moving with line A, while line B is out of contact with the cylinder. Cylinder C is mounted for rotation on a second cylinder D which is provided with opposed flat cam surfaces $D^1$. D is free to move parallel to A and B without turning on its own axis. Slidably mounted in cylinder C and arranged for radial movement relative thereto is a sliding member E which is normally urged towards cylinder D, as means of a spring, not shown. A pin P is secured to cylinder C and is disposed with the axis thereof on the periphery of said cylinder, such pin being also slidably mounted in an arm or slide F. Arm F represents a driven member sliding on a rod K. As will be noted in Figure 1, the axis of P coincides with line A and moves with the latter. However, as the central axis of cylinder C is free to move and the cylinder is disengaged from line B, there are no forces shown which would rotate cylinder C, the latter being held in position on cylinder D by the action of member E engaging cam surface $D^1$ on the cylinder D. All parts except B are represented as moving to the left with A in fixed relative position, with the driving force from A transmitted to F through C and P.

To carry out the purposes of the invention the velocity of the driven element F must be changed from the velocity and direction of driver A to the velocity and direction of driver B. Figure 2 illustrates how that change in velocity and direction is effected. The element E has been moved radially outwardly as by any suitable actuating means, disengaging the same from flat surface $D^1$ on D, permitting cylinder C to rotate on D; E, at the same time, engaging driver B, stopping the right to left motion of D and causing C to rotate in a clockwise or right hand direction as indicated. As above stated, A and B are assumed to have the same speed in opposite directions, giving to the differential element C a rotary motion about a stationary axis during the time it is engaged to both A and B. Pin P, carried on C, imparts to F, the driven element, a harmonic motion relative to C, bringing F to a stop and then accelerating it in the direction of B. When P reaches the point where C contacts B both P and F will be moving to the right as viewed in the drawing at the speed of B. At this point in the operation the rotation of C must be stopped and driver A must be disengaged from operation in order to keep P in engagement with B. This is automatically effected by the spring-loaded slide E coming into engagement with the flat surface on the lower side of D and, in doing so, approaching the center of D and disengaging from A.

Figure 3 shows the operation completed, with C out of contact with A and all the elements (except A) moving as a unit with B, the driving force transmitted from B to F through C and P. To reverse the motion of F and put it again into engagement with A the element E may be moved into contact with A, causing C to make another clockwise half rotation, bringing the elements back into the position shown in Figure 1. It should be noted that in the positions shown in Figures 1 and 3 the element E has no part in the transmission of force, but is merely utilized to prevent any rotation of C due to inertia forces.

It should be readily appreciated that with some suitable means for actuating member E, a sequential alternating movement can be imparted to the driven member, Figure 4 is similar to Figures 1 to 3, with a point G coinciding with the position of pin P in Figure 1. Slide F is angularly related to a line normal to lines A and B to form an angle GOP. A circle Y, lying on the points G, O and P, is one-half the diameter of cylinder C and tangent to the latter at point G so that the axis of pin P is on the circle Y. As line PG is normal to line OP, the line of action of slide F on pin P is through the point G. Thus, rotation of cylinder C produces the same motion of slide F on rod K as in Figure 1.

A slightly different representation of transmission forces is indicated in Figure 5 in which a driving force is transferred from a cylinder A to cylinder B, both cylinders having a common center at O. A cylinder C, similar to that shown in Figures 1 to 3, turns on a cylinder D with flattened cam surfaces as above explained. Cylinder D is free to revolve around A without turning on its own axis, which may be fixed to a radial arm pivoted at O. A driven arm F slidably carries a pin P which is mounted on the periphery of cylinder C, with one end of the arm secured at the point O. The transfer of driving forces from A to B is accomplished in the same manner as explained with reference to Figures 1 to 3, but in place of the diagrammatic line representations of forces A and B, such forces are now more accurately represented by cylinders. If cylinders A and B are assumed to be constantly rotating in opposite directions with equal peripheral speed the cylinder C, while in contact with A and B, rotates about a stationary axis as in Figure 2. The driven element F has been decelerated from the angular velocity of A to a momentarily stationary position from which it will be accelerated to the angular velocity of B. When the axis of P coincides with the line of contact between C and B locking element E, performing the same function as in Figures 1, 2, 3 will, at that time, engage the lower flat surface on D and disengage from A, stopping the rotation of C on D and permitting D, C, P and F, to revolve as a unit around the center O at the angular velocity and in the direction of rotation of B, with the driving force transmitted from B to F through C and P. The driven element may be again put into engagement with A as explained in connection with Figures 1, 2, and 3, so that the motion of the driven element may be reversed at will. The general type of acceleration and deceleration is one readily adaptable for quick return mechanisms.

In Figure 6, a further development of the basic operating principle is represented by three equal cones, A and B being the alternate driving cones, and C representing the differential cone, as in the previous illustrations.

This form of motion, which is the one embodied in the three mechanisms to be later described, may be best understood by considering it as a modification of Figure 5, in which the differential cylinder C has its axis turned to intersect the axis O at 90 degrees. C and A become cones and the cylinder B of Figure 5 becomes a cone equal to A and C. The point P on an element of cone C is necessarily always the same distance from the axis intersection, or cone apex, and moves along a spherical surface instead of in a plane as in the case of Figures 1 to 5. Its path in a plane of axis O is a circular arc with its center at the cone apex and its ends at the lines of intersection of cones A and B with the said plane. Here the point P is expanded to and indicated by a ball sliding in the arcuate slotted arm or annular slide F which is the driven member coaxial with A and B, oscillating from P to N. In the position shown, A has turned left hand and B right hand, each 90 degrees, and C has turned 90 degrees, with F at the end of its stroke, having turned 45 degrees from OX. This position corresponds to the position of F in Figure 5. When A and B have each made an additional one-quarter turn, P will be on an element of cone B and slide F will be turning with B. Motion of cone A will have no effect on driven element F and will be disengaged at this point as indicated in the preceding diagram.

The motion of the driven arm or slide is suggested in Figure 7 wherein the letters A and C represent the equal base circles of two cones in rolling contact. A point on circle A will move from X to M to H, while a point on circle C moves from X to P to PP, in harmonic motion. The lines OR and OPP show the positions of the plane of the slide, and as will be understood, the shorter the radius XPP becomes the more nearly the motion becomes harmonic.

The essential elements have been shown in forms which were chosen as suitable for illustration of the principle of the invention, though not necessarily suitable for various embodiments. For example, the element E, as shown, could be readily adapted to function with drive elements and differential wheels having smooth surfaces of contact. However, in the practical embodiments presently to be described, the drive and differential elements are in the form of gears remaining always in mesh, and the function of E is performed by spring-loaded elements, one on each drive element, adapted to engage the drive element to its actuating member and to automatically disengage it therefrom and stop its rotation relative to the other elements. Thus, the drive elements are put into and out of operation by means of engagement with their respective actuating members rather than with the differential wheel as in the diagrams.

Figure 9:
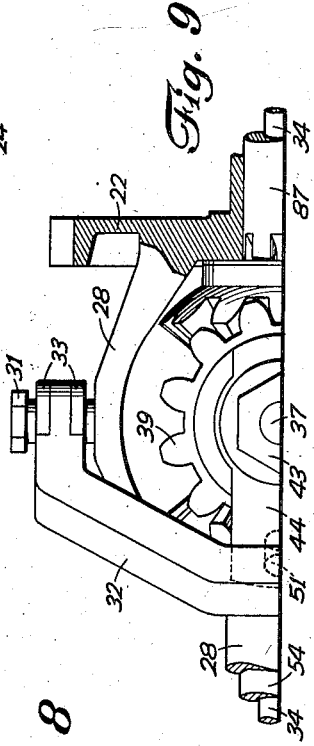
Figure 9 is a view, partly in section, of a portion of the apparatus shown in Figure 8, with the cage unit rotated through 90 degrees.
Figure 10:
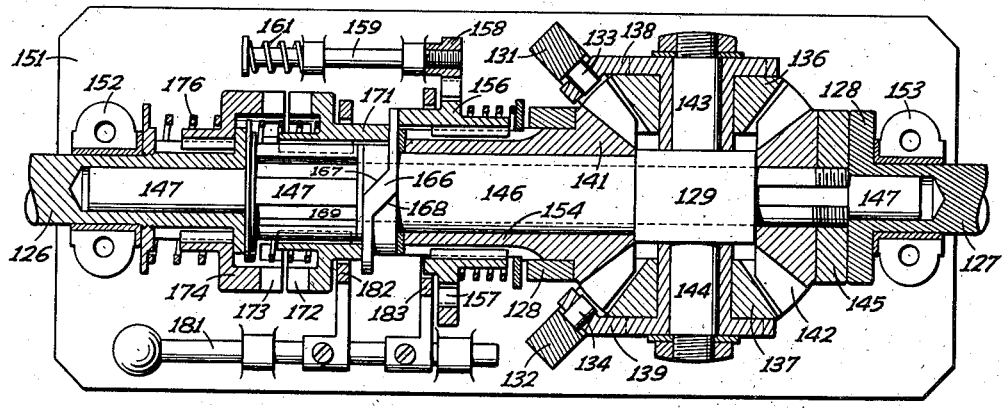
Figure 10 is a view similar to Figure 8, but disclosing a form of transmission arranged to alternately start and stop a driven member.

As shown in the diagrams the driven element and the differential wheel are operatively connected on an eccentric axis of the differential wheel by means restricting motion of the eccentric axis to a direction angled to the direction of motion of the driven element. In Figures 5-12 the motion of the eccentric axis is restricted to a plane of the axis of the driven element; in Figures 5 and 6 by a slide fixed to the driven element and, in the embodiments to be shown, by means which are the mechanical equivalent of the slide in Figure 6, permitting the same relative motion between the eccentric axis and the driven element. In Figures 8, 9 and 10 the means shown consist of a link, sometimes called a conic link, having its two pivotal axes intersecting at an angle of 90 degrees, the link engaged on one of its pivotal axes to the driven element and on the other of its pivotal axes to the differential wheel, on its eccentric axis. With the link pivoted to the driven element on an axis intersecting the rotational axis of the driven element at right angles the other axis of the link moves in a plane of the axis of the driven element, giving to the eccentric axis of the differential wheel the same motion as the slide in Figure 6.

Figure 11:
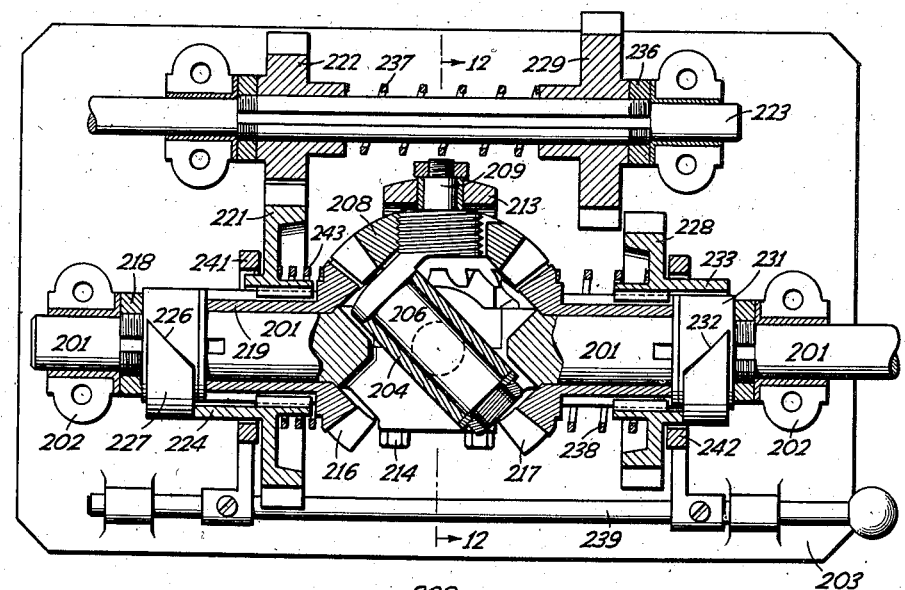
Figure 11 is a plan view, partly in section, of another modified form of my invention.
Figure 12:
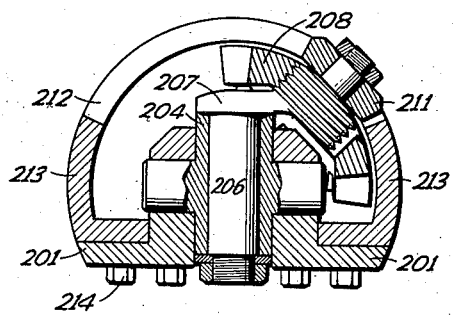
Figure 12 is a portional end sectional view of the device of Figure 11.

In Figures 11 and 12 the eccentric axis of the differential wheel has its motion restricted to a plane of the driven element by means of a shaft fixed to the differential wheel on its eccentric axis, and journalled in a sleeve which is pivoted to the driven element for oscillating motion in a plane of the axis of the driven element, permitting the eccentric axis the same relative motion as in Figure 6.

From the foregoing explanation, together with the diagrammatic illustrations, I have attempted to simplify the operation of the presently to be described apparatus. It should be clear how the power is transmitted from either of two power sources, designated by the letters A and B, to a driven member in a smooth and efficient manner. It should likewise be understood that with the foregoing principles of operation, a wide range of different types of power transmissions may be effected, such as those set forth in the first mentioned object or feature of this invention.

Referring now to the apparatus described in Figures 8 and 9 of the drawings, mechanism is provided to transfer rotary power from a gear wheel 21, sometimes referred to as a "driver," to a driven member 22, also indicated in the form of a gear wheel. An alternate driver wheel 23 is also provided, and as will be hereinafter more fully explained, driver wheel 23 may be rotating at the same or at a different speed from driver 21 and likewise may be rotating in the same or in the opposite direction from driver wheel 21. As will also be made clear, when the driver gears 21 and 23 are disengaged, their speeds may be altered by any suitable mechanism, or, in fact, such gears could be replaced by gear clusters to provide the necessary or desirable speed changes. Although the driven member 22 and alternate driving members 21 and 23 are shown in the form of gears, it will likewise be understood that sheaves, sprockets or other power transmission means could be utilized.

The entire assembly is indicated as being supported on a frame or base 24, and extending upwardly from the latter at longitudinally spaced portions, are a pair of bearings 26 and 27 arranged to rotatably support a central cage unit 28. As will be noted, cage 28 is secured to, and carries, the driven gear 22 whereby, when the cage is rotated, gear 22 will be likewise rotated, and power may be taken therefrom. Cage 28 comprises a central generally cylindrical element and a pair of oppositely extending longitudinal hollow shafts, these latter shafts being engaged by the previously mentioned bearings 26 and 27 for rotatable support of the entire cage assembly. Extending outwardly from the central cage element is a pair of axially aligned studs 29 and 31 whose axes are substantially at right angles to the axis of the cage element. These studs serve as trunnion bearings for two connecting bars 32 and 33, and as will be best seen in Figure 9, the ends of bars 32 and 33 intermesh at their point of engagement with the studs so as to prevent relative axial movement between the bars. However, as the studs 29 and 31 extend from the outer peripheral surface of cage 28 a distance greater than the combined thickness of such intermeshed portions of the bars, the latter may be moved axially along the studs as a single unit. Each bar is generally triangular in form and the two bars extend on opposite sides of the cage, with an included angle of approximately 90 degrees therebetween.

Extending longitudinally of the entire transmission unit, and at right angles to the axes of studs 29 and 31, is an idle shaft 34 on which is secured a central block 36 disposed centrally and within cage 28. Block 36 is provided with a pair of fixed cross arms 37 and 38 extending in diametrically opposed directions from the block and generally perpendicular to the axis of idler shaft 34, and these cross arms serve to rotatably support a pair of generally conical differential gears 39 and 41 disposed in diametrically opposed relation to each other. The inner portion of each differential gear is positioned adjacent its respective surface of block 36, and the gears may be freely journalled on cross arms 37 and 38 by having the hub portions 42 of the gears slidably mounted on the arms, and prevented from axial movement therealong by means of nuts 43 engaged with the threaded end portions of said arms.

Differential gears 39 and 41 are provided at their outer portions with integral crank arms 44 and 46 which extend at generally right angles to the hub axes, the distal end portions of such arms having angularly related extensions 47 and 48 suitably apertured, as indicated at 49, to receive cylindrical drive pins 51 and 52. As will be seen in Figure 8 of the drawings, these drive pins form inwardly projecting integral extensions of bars 32 and 33. It will further be observed that the axes of the two pins lie in the same plane and perpendicular to the pivotal axis of bars 32 and 33.

A drive gear 53 is splined and secured to a hollow shaft 54 which encompasses the idle shaft 34, the gear 53 being held in operative engagement with differential gears 39 and 41 by nuts 56 threaded to the ends of the idle shaft will be more fully explained hereinafter. Interposed between positioning nut 56 and the end of shaft 54 is a collar 61 and a ball thrust bearing provided to take the end thrust of gear 53. Thus, drive gear 53 meshes with each of the differential gears and rotates with shaft 54 about an axis perpendicular to the axes of the differential gears. It is important to note that the center of each crank arm aperture 49 is on an element of the pitch cone of its respective differential gear, so that in the position indicated in Figure 8, the axes of pins 51 aand 52 are on the lines of contact of the pitch cones of gears 39 and 41 with the pitch cone of drive gear 53. In other words, a rotational force imparted to drive gear 53 will be entirely transmitted to the bars 32 and 33 through the gears 39 and 41, crank arms 44 and 46, and pins 51 and 52. Although the bars 32 and 33 are free to oscillate on the pivots 29 and 31 any rotary motion of the bars about the axis of the driven element will be transmitted to the driven element. Thus, all motion of gear 53 is transmitted to driven gear 22. The elements as shown are in the same relative position as their corresponding elements in Figure 1, gear 53 represented by A, pins 51 and 52 by P, bars 32 and 33 by the slide in F, gears 39 and 41 by C, shafts 37 and 38 by D, and gear 88 by B. Whereas B is out of operation in the diagram due to its disengagement from the differential wheel, gear 88 is out of operation due to its disengagement from its actuating member 23. The means for putting each of the drive gears 53 and 88 into and out of operation, and performing the function of element E in the diagrams will now be explained.

Means are provided for operatively connecting drive gear 21 and driven gear 22, the latter being connected to and rotatable with cage 28 so that upon rotation of the driver, gear 22 will rotate with such driver gear. As above mentioned, immediately inwardly of nut 56, and keyed to idle shaft 34, is a generally cylindrical element or collar 61 which is provided on its inner face with a cam surface 62. Disposed longitudinally outwardly of driver gear 21 is a clutch member, and by way of example, a toother clutch 63 is illustrated, although it will be apparent to those skilled in the art that other clutch arrangements could be utilized. Clutch 63 is splined to the hollow shaft 54 in axially extending grooves 64 so as to permit the clutch to be selectively engaged with and disengaged from clutch teeth 66 provided on the outer face of drive gear 21, and it should be understood that drive gear 21 is freely journalled on cage 28, so that unless the clutch mechanism is engaged, rotation of drive gear 21 will not impart any movement to cage 28, and hence, will not impart any movement to driven gear 22. Normally, clutch 63 is urged outwardly and away from clutch teeth 66 by means of a spring 67 interposed between drive gear 21 and clutch 63. Clutch 63 is provided with a hub extension 68, the latter serving as a slidable mounting for a cam sleeve 69 and its attached guide sleeve 71 which overlies cam element 61. Cam sleeve 69 is urged outwardly by the action of a spring 72 which is disposed between an annular flange 74 provided on cam sleeve 69, and clutch 63, thereby urging cam sleeve 69 against a retaining collar 73 secured to clutch hub 68. The distal end 76 of cam sleeve 69 utilizes two helical cam surfaces, one right hand and the other left hand which engage the cooperating cam surface 62 on element 61. It will be appreciated that clutch 63, hub extension 68, cam sleeve 69, guide sleeve 71, and spring 72 cooperate for substantially unitary operation.

With the foregoing construction in mind, and with particular reference to Fgure 8, the operation of the unit should be clear. As will be noted, the end 76 of the cam sleeve is riding on the inwardly projecting portion of cam surface 62, thereby urging cam sleeve 69, and consequently clutch 63 to the right and maintaining the latter in engagement with teeth 66 on driver gear 21. Thus, as gear 21 is caused to rotate, clutch 63 will likewise rotate, as will the hollow shaft 54. As drive gear 53 is mounted on said shaft, gear 53 will also rotate, driving the differential gears 39 and 41 which in turn drive cage 28 and driven gear 22 in the manner hereinabove explained.

During the foregoing power transmission from gear 21 to driven gear 22, the movement of the alternate driver gear 23 has no effect on the mechanism. Gear 23 is assumed to be rotating at a different speed from gear 21, and the changeover from gear 21 to gear 23 will next be discussed. It will be noted that the mechanism disposed longitudinally outwardly of gear 23 is substantially identical to that associated with gear 21. So long as gear 21 is engaged with clutch 63, gear 23 will be out of engagement with its clutch 81, and the end portion of cam sleeve 82 is riding on the low portion of cam surface 83 provided on the inner face of element 84. A hollow shaft 87 carries a conical drive gear 88, just as shaft 54 carries the opposed drive gear 53, gear 88 being intermeshed with the pair of differential gears. A spring 89, similar to spring 67, urges the cam surfaces in their aforesaid relationship and results in locking clutch 81, shaft 87 and conical drive gear 88 to the idle shaft 34, and prevents any relative rotation between the gears in the cage.

Means are utilized for readily transferring the driving force from gear 21 to gear 23, which include a shift rod 91, here shown as having a manually engageable handle 92, and arranged for longitudinal movement through any suitable support bushings 93. At axially spaced points on the rod, I provide a pair of fixed collars 94 having transversely extending shifting arms with rings 96 and 97 secured thereto. The rings are positioned outwardly of and adjacent the annular flanges 74 and 98 provided on the respective cam sleeves. By moving the rod 91 to the left, as viewed in the drawings, arm and ring 97 will urge the cam sleeve 82 to the left resulting in engagement of clutch 81 with the clutch teeth 99 on gear 23. Conversely, movement of arm 96 to the left will permit cam sleeve 69 to move to the left and release clutch 63 from drive gear 21. A spring 106 provides means for releasing cam sleeve 82 from cam surface 83 in the event the interengaging teeth on gear 23 and clutch 81 lock without being fully engaged.

With the shift rod in the left-hand position, gear 23 will drive clutch 81 and hollow shaft 87, thereby rotating the conical drive gear 88 relative to the opposed drive gear 53, driving the differential gears and cage unit, and accelerating the rotation of driven gear 22. Of course, if gear 23 is moving at a slower speed than gear 21, a deceleration of gear 22 will result. In any event, driven gear 22 will reach the rotative speed of drive gear 88 when the latter has made one complete turn relative to drive gear 53. Elements 61 and 84 will have made one-half turn relative to their respective cam sleeves 69 and 82, the high point on sleeve 82 will be riding on the high point of cam surface 83, and the high point on sleeve 69 will be urged into the recess of cam surface 62 by action of spring 67, releasing clutch 63 from drive wheel 21, and stopping the motion of cam sleeve 69 and conical drive gear 53 relative to the rest of the mechanism. During the time either of the drive gears are disengaged, it will be apparent that their speeds can be changed, and it will likewise be clear that when rod 91 is shifted to the right, gear 23 will become inoperative, and power will once more be transmitted through gear 21. Although positive engagement clutches have been illustrated, friction clutches could likewise be utilized, but probably with a slight efficiency loss, with the relief springs 72 and 106 acting as conventional frictional clutch pressure springs.

From the foregoing explanation, both the structure and method of operation of my power transmission should be understood. It should likewise be clear that the driven member 22 will be accelerated or decelerated with generally harmonic motion as the driving force is shifted from one driver to another, and that during the shifting operation the driven member will actually be in engagement or operating relationship with both of the driving forces.

In Figure 10, I have illustrated a somewhat modified form of my invention in which a direct in line drive is utilized to alternately start and stop a driven shaft with uniform and gradual acceleration and deceleration. While the principles of operation remain the same, the structure has been modified to carry out the foregoing steps. Here, a shaft 126 is arranged to be continuously rotated by any suitable power source, and is intended to actuate a driven shaft 127 fixedly secured to cage unit 128 and disposed in axial alignment with drive shaft 126. Cage 128 is substantially identical to that shown in Figures 8 and 9, and includes a central block 129, connecting bars 131 and 132 having pins 133 and 134 thereon, opposed conical differential gears 136 and 137, crank arms 138 and 139, and bevel gears 141 and 142. Here, too, the differential gears are journalled on cross arms 143 and 144 carried by the idle block 129, which is secured to an idle shaft 146, the latter encompassing a shaft 147 which is journaled in drive shaft 126 and which is also keyed to bevel gear 142 and secured in place by a threaded collar 145. In the position indicated in the figure, the apparatus is in the halted position, which shaft 127 stationary, and pins 133 and 134 on the pitch cone of bevel gear 141.

Drive shaft 126 is mounted over a base 151 by means of bearings 152, with similar bearings 153 supporting the driven shaft 127 and cage 128 assembly.

Bevel gear 141 is provided with a hub extension 154 on which is splined for longitudinal movement a sliding clutch 156 having peripherally disposed teeth 157, arranged to mesh with the teeth of an annular ring 158. Ring 158 is mounted on two or more sliding rods 159 (only one being illustrated in the drawing) and is spring-loaded as indicated at 161, to facilitate release of the clutch 156 from the cam surface 168.

As hereinabove mentioned, hollow shaft 146 carries thereon the cross-arms 143 and 144 for the differential gears, and also carries a cylindrical cam element 166 having opposed cam surfaces 167 and 168. On a radially enlarged portion of shaft 147, I provide grooves 169 to receive a sliding clutch 17. As indicated in the figure, the projecting end portion of clutch 171 is riding in the recessed portion of the cam surface 167, or in the inoperative position. Clutch 171 is also provided with teeth 172 engageable with similar teeth 173 on another clutch 174 slidably mounted on drive shaft 126. A relief spring 176 is again utilized to release clutch 171 from cam surface 167 in the event the teeth 172 and 173 lock without being fully engaged.

In order to place the mechanism in operative power transmitting condition, a shift rod 181 having two spaced radially extending shifting arms is provided. Each of the arms carries an annular ring 182 and 183, and by moving rod 181 to the left, the ring 182 will urge clutch 172 to the left, effecting an intermeshing of clutch teeth 172 and 173, and causing rotation of clutch 171 and its shaft 147. This will likewise cause rotation of bevel gear 142 which, through the differential gears, links, etc., will cause the cage and driven shaft 127 to rotate as previously explained.

It will be understood that if ring 158 was replaced by a gear mating with a gear on clutch 156, and if such replacement gear was rotating at a speed different from that of drive shaft 126, the apparatus could be utilized as a two-speed transmission, or as a reversing mechanism. It will also be understood that movement of the rod 181 back to the position shown in the drawing will decelerate the driven shaft 127 to zero at a rate of deceleration substantially as indicated by Figure 7 of the drawings and the associated description thereof, and disconnect shaft 126 from shaft 127.

A further embodiment of the present invention is illustrated in Figures 11 and 12 of the drawings, wherein the driving force is transmitted from an eccentric gear to a driven shaft 201, the latter being rotatably supported in spaced bearings 202 overlying a base or frame 203. The power transmission in this case is transmitted through a bearing sleeve 204 pivotally mounted in an open portion of driven shaft 201 and arranged for oscillation in a plane of said shaft. Rotatably journalled in bearing sleeve 204 is a shaft 206 which carries an angularly disposed arm 207 to which a bevel gear 208 is secured. As will be noted, the axis of shaft 206 is eccentric to the axis of gear 208 and is disposed on an element of the pitch cone of the latter. Extending axially outwardly of gear 208 is a pin 209 rotatable in a block 211, the latter being disposed in a peripherally disposed arcuate slot 212 of a guide ring 213. Guide ring 213 is secured to the driven shaft 201 in any suitable manner, such as by bolts 214, so as to properly engage bevel gear 208 with each of the opposed beveled drive gears 216 and 217. As will be observed, Figure 12 is a sectional view taken along the peripheral center line of ring 213, but indicates the bearing sleeve 204 turned through an angle of 45 degrees in an upright position and at one end of travel of block 211 in the guide ring slot.

Drive gear 216 rotates on shaft 201 and is maintained in axial position thereon by a collar 218 threadedly engaged to a portion of said shaft and indirectly bearing against the distal end of the gear hub 219. A spur gear 221 is splined to hub 219 and arranged for axial movement therealong so as to selectively be engaged with and disengaged from another spur gear 222 mounted on a shaft 223. Gear 221 is maintained in engagement with gear 222 by means of its projecting portion of its associated cam sleeve 224 riding on the high point of a cam surface 226 provided on a cam ring 227 keyed to shaft 201.

The unit is substantially symmetrical and the other beveled drive gear 217 slidably carries a spur gear 228 which may be engaged with a spur gear 229 on shaft 223. A cam ring 231 with its cam surface 232 effects engagement of the projecting portion of a cam sleeve 233 on gear 228 with the low point on the cam surface and disengagement of gears 228 and 229 when gears 221 and 222 are engaged. Spur gears 222 and 229 are mounted for sliding movement on shaft 223 and urged towards their stop members 236 by a spring 237, such spring serving both of these gears as a relief spring so as to permit gears 221 and 228 to release from their respective cam surfaces in case of incomplete engagement of the resective sets of spur gears.

In the position shown, spur gear 228 is held out of engagement with gear 229 and against the lower cam surface by a release spring 238 and thereby preventing motion of drive gear 217 relative to the rest of the mechanism. By moving shift rod 239 with its associated shift rings 241 and 242 to the left, gear 228 will move into engagement with gear 229, compressing spring 238, and on the other side of the mechanism spring 243 will release gears 221 and 222 after gear 221 has made one turn relative to gear 228.

Upon such shifting, sleeve 204 will rotate 90 degrees and power transmission will be effected through the then engaged spur gears.

As shown in Figure 11, the elements are in the same relative position as their corresponding elements in Figure 1, gear 216 represented by A, shaft 206 by P, pivoted sleeve 204 by the slide in F, 201 by F, gear 208 by C, 209 by D, gears 221 and 228, with the cams on their hubs, by E, and gear 217, out of engagement with gear 229, by B.

While I have merely chosen to illustrate three particular embodiments of my invention, it will be understood that other structures may be utilized in which a change of speed or direction may be effected by shifting the drive from one train of mechanism to another, without departing from the scope of my invention. It will also be understood that the terms "driving" and "driven" members may be substituted for each other, for in some installations it may be desirable to utilize a single driving member and a plurality of driven members, and the mechanism is entirely reversible in all respects, including direction and driving and driven senses.

I claim:

1. Apparatus of the character described comprising a pair of drive wheels disposed in axial alignment, a driven member in axial alignment with said drive wheels, a differential wheel disposed between and in peripheral contact with each of said drive wheels, an actuating member for each of said drive wheels and arranged for rotation by an outside force, means coupling each of said actuating members to its respective drive wheel, means for automatically uncoupling each of said actuating members when the other of said actuating members is operatively coupled to its drive wheel, and means operatively connecting said driven member and said differential wheel, said last named means including a connecting element rotatable with said driven member and pivotally connected to said differential wheel about an axis lying on the pitch surface of said differential wheel.

2. A speed changing mechanism including a driven member and two drive wheels all in axial alignment for rotation about a single axis, a differential wheel disposed between and in rolling engagement with both drive wheels, means pivotally connecting said driven member to said differential wheel on an eccentric axis of the latter and on an axis perpendicular to the axis of rotation of said driven member, said means being restricted in movement relative to the rotation of said driven member, an actuating member for each drive wheel, means for releasably coupling each actuating member to its drive wheel, and means for uncoupling each of said actuating members and stopping rotation of its drive wheel when the other of said actuating members is rotating its drive wheel.

3. Power transmission apparatus comprising an epicyclic train of gears with a pair of drive gears and a driven member lying on a common axis, an idle gear disposed between and intermeshed with each of said drive gears, means operatively coupling said idle gear to said driven member including a pivot element having the axis thereof fixed on the pitch surface of said idle gear and connected to said driven member in non-rotatable relationship, a power source for each of said drive gears, releasable coupling means interconnecting each power source with its respective drive gear, and clutch means automatically actuable to disconnect each of said power sources from its drive gear when the other of said power sources is connected to its drive gear whereby each of said drive gears may be stopped relative to the other drive gear and said idle gear.

4. Apparatus of the character described comprising a pair of spaced bevel drive gears having a common axis of rotation, a driven member having an axis of rotation on said common axis, a bevel idle gear disposed between and operatively engaged with each of said drive gears, means operatively connecting said idle gear and said driven member including a pivot having an axis eccentrically disposed to the axis of said idle gear and lying on the pitch circle of the latter so that the axis thereof may be selectively moved to coincide with the instantaneous axis of rotation of said idle gear relative to each of said drive gears, means restricting movement of said driven member relative to said pivot, a pair of separate rotatable actuator members, means coupling each of said latter members to the respective drive gears, and means for disengaging each actuator member from its drive gear for stopping the rotation thereof relative to said driven member.

5. A transmission device comprising a pair of spaced bevel drive gears disposed in axial alignment, a driven member mounted for rotation on said axis, a pair of diametrically opposed arms rotatable about said axis, a bevel differential gear rotatably mounted on each of said arms with each of such gears in mesh with each of said drive gears, a pair of connecting bars each having the ends thereof pivotally secured to opposite sides of said driven member on an axis perpendicular to the axis of rotation thereof, each of said bars being pivotally attached to the respective differential gears on an eccentric axis of the latter, said eccentric axis lying on a line through the pitch circle and cone apex of the gear, an actuating member for each of said drive gears, and means releasably coupling each of said actuating members to its respective drive gear.

6. Apparatus as set forth in claim 5 in which means are provided permitting said bars to simultaneously move axially along their pivotal connections and restricting any relative axial movement therebetween.

7. Power transmission apparatus comprising a pair of separate driving members arranged for rotation at different speeds, a driven member mounted for rotation and arranged to be selectively actuated by either of said driving members, a rotatable cage member secured to said driven member, a pair of spaced bevel drive gears having an axis of rotation coinciding with the axis of rotation of said driven member and said cage member, a block-like member mounted for rotation within said cage member and having an arm thereon extending substantially normal to the axis of rotation of said bevel drive gears, a bevel differential gear journalled on said arm and operatively intermeshed with each of said drive gears, means extending outwardly from said differential gear along a cone element thereof engageable with said cage member, means permitting restricted movement of said last-named means relative to the rotation of said driven member, and means releasably coupling each of said driving members to the respective drive gears.

8. Apparatus as set forth in claim 7 in which such coupling means includes clutch elements automatically disengageable upon engagement of the clutch elements of the other driving member.

9. Apparatus as set forth in claim 7 including a shifting bar for urging one set of clutch elements into operative engagement, and cam means forcing the other of said clutch elements out of operative engagement.

10. A speed changing mechanism including a pair of separate driving members arranged for rotation at different speeds, a driven member mounted for rotation and arranged to be selectively actuated by either of said driving members, a rotatable cage member secured to said driven member, a pair of spaced bevel drive gears having an axis of rotation coinciding with the axis of rotation of said driven member and said cage member, a pair of axially aligned studs extending outwardly from said cage member perpendicular to the axis thereof, a pair of connecting bars each having the ends thereof journalled on said studs, an idle shaft axially aligned with said driven member, a block mounted on said idle shaft, a pair of opposed bevel idle gears journalled on said block and intermeshed with each of said drive gears, means interconnecting each of said connecting bars to the respective idle gears, said interconnection lying on an element of the pitch cone of said idle gear whereby a rotational force on one of said drive gears will be imparted to said bars and said cage member, and clutch means interposed between each of said driving members and the respective drive gears.

11. Apparatus as set forth in claim 10 in which said interconnecting means includes a crank arm extending from each of said idle gears, and pin means engageable with said bars and arms with said pins on the lines of contact of the idle and drive gears.

12. Apparatus of the character described comprising a rotatable driven member, a generally annular cage member secured to said driven member having a central axis perpendicular to the axes of rotation thereof, a pair of separate drive members, a pair of bevel drive gears diametrically opposed within said cage member and having a common axis of rotation with said driven member, a bevel idle gear journalled for rotation in said axis about an axis perpendicular to said drive axis and intermeshed with each of said drive gears, a pivotal connecting element fixed to said bevel idle gear with the pivotal axis thereof disposed on the pitch cone of said bevel idle gear, an element fixed to said driven member and adapted to engage said connecting element and guide said pivotal axis to sequentially be positioned with the instantaneous axis of rotation of said idle gear with each of said driving gears, clutch means on each of said drive gears, and cooperating clutch means on each of said drive members.

13. Power transmission apparatus including two drive elements and a driven element arranged for motion in parallel paths, a differential wheel adapted for rolling engagement with both of said drive elements, means operatively connecting said driven element to said differential wheel on an eccentric axis of the latter, said means adapted to bring said driven element substantially to rest relative to each of said drive elements alternately, means for selectively engaging each of said drive elements with said differential wheel for operation and means for automatically releasing each of said drive elements from said differential wheel when the other of said drive elements is substantially at rest relative to said driven element.

14. Power transmission apparatus including two drive elements adapted to be driven at different velocities and operatively connected through a differential element, a driven element, means operatively connecting said driven element to said differential element including means to gradually change the velocity of the driven element from the velocity of one drive element to the velocity of the other drive element, means for selectively engaging each drive element for operation, and means for automatically releasing each drive element from operation when the other of said drive elements is substantially at rest, relative to the driven element.

15. Power transmission apparatus including two drive elements adapted to be driven at different velocities, a differential element operatively connecting said drive elements, one to the other, a driven element operatively connected to said differential element by means producing a reciprocating motion between said differential element and said driven element upon relative rotation of said drive elements and changing the velocity of the driven element from the velocity of one to the velocity of the other of said drive elements, and means for selectively engaging for operation and automatically disengaging from operation each of said drive elements.

References Cited in the file of this patent

UNITED STATES PATENTS

| | | |
|---|---|---|
| 1,190,407 | Helmbold | July 11, 1916 |
| 1,333,729 | Pollard | Mar. 16, 1920 |
| 1,614,554 | Hohm | Jan. 18, 1927 |
| 2,503,894 | Wildhaber | Apr. 11, 1950 |
| 2,535,774 | Armelin | Dec. 26, 1950 |
| 2,624,214 | Arensberg | Jan. 6, 1953 |